(12) United States Patent
Sanford

(10) Patent No.: US 6,843,412 B1
(45) Date of Patent: Jan. 18, 2005

(54) METHOD AND APPARATUS FOR PROVIDING MONEY FOR OPERATING A GAMING MACHINE

(76) Inventor: Kirk Sanford, 20 Black Fox Way, Woodside, CA (US) 94062

( * ) Notice: Subject to any disclaimer, the term of this patent is extended or adjusted under 35 U.S.C. 154(b) by 482 days.

(21) Appl. No.: 09/698,553

(22) Filed: Oct. 27, 2000

(51) Int. Cl.[7] .............................................. G06F 17/60
(52) U.S. Cl. ....................................... 235/379; 235/380
(58) Field of Search ................................ 235/379, 380, 235/381, 382; 902/23, 24; 705/39, 42, 44

(56) References Cited

U.S. PATENT DOCUMENTS

| | | | | |
|---|---|---|---|---|
| 5,038,022 A | * | 8/1991 | Lucero | 235/380 |
| 5,457,306 A | * | 10/1995 | Lucero | 235/380 |
| 5,916,024 A | * | 6/1999 | Von Kohorn | 463/40 |

\* cited by examiner

*Primary Examiner*—Daniel Stcyr
(74) *Attorney, Agent, or Firm*—Sue Z. Shaper

(57) ABSTRACT

A system and method for providing money or credit to the user of an entertainment machine. The method includes requesting money through a point of sale device located at or near the entertainment machine. The request is forwarded to an active layer computer and server that provides initial screening of the request. If approved, the request is forwarded to a host processor, which in turns checks with the user's financial institution for preliminary approval therefrom. If the financial institution provides the preliminary approval, the host processor provides electronic funds to the user at the entertainment machine.

30 Claims, 1 Drawing Sheet

METHOD AND APPARATUS FOR PROVIDING MONEY FOR OPERATING A GAMING MACHINE

BACKGROUND OF THE INVENTION

1. Field of the Invention

The present invention relates to gaming systems, and more particularly, to a method and apparatus for providing money for operating a gaming machine such as, for example, a slot machine, by debiting an account with a debit card.

2. Description of the Prior Art

Gambling casinos and other business establishments have a plurality of a gaming machines, such as, for example, slot machines, video card machines, etc. These machines are simply games of chance that some individuals play for entertainment and others play with the hope of receiving large winnings.

Some casinos have cashiers located at strategic positions in the casinos for use by patrons to obtain coins for use in playing the gaming machines. When a player is at a gaming machine and needs more coins, he often must walk away from the machine, find a cashier and obtain more coins. Alternatively, many casinos have cashiers that will come to the player. Finally, many machines are now configured with "bill acceptors" to accept dollar bills in addition to coins.

SUMMARY OF THE INVENTION

The present invention provides an entertainment machine, such as a gaming machine, that is coupled to a computer, which in turn is coupled to an intermediate server, which in turn is coupled to a financial institution via an ATM-type network. The player requests money from his account at the financial institution at the gaming machine and the computer screens the request for a first level approval/disapproval. If approved, the computer forwards the request to the intermediate server, which then checks for preauthorization at the financial institution over the ATM-type network. Based upon the response from the financial institution, the intermediate server electronically transfers money to the entertainment machine.

In accordance with one aspect of the present invention, the transaction is treated as a point of sale transaction.

In accordance with another aspect of the present invention, the money is electronically transferred to a cashier cage or other authorized personnel at a location that contains the entertainment machine.

In accordance with another aspect of the present invention, the system operates over the internet, over a standard telephone modem or by a wireless system.

Other features and advantages of the present invention will be understood upon reading and understanding the detailed description of the preferred exemplary embodiments found herein below, in conjunction with reference to the drawings, in which like numerals represent like elements.

DETAILED DESCRIPTION OF THE PREFERRED EXEMPLARY EMBODIMENTS

Figure 1:
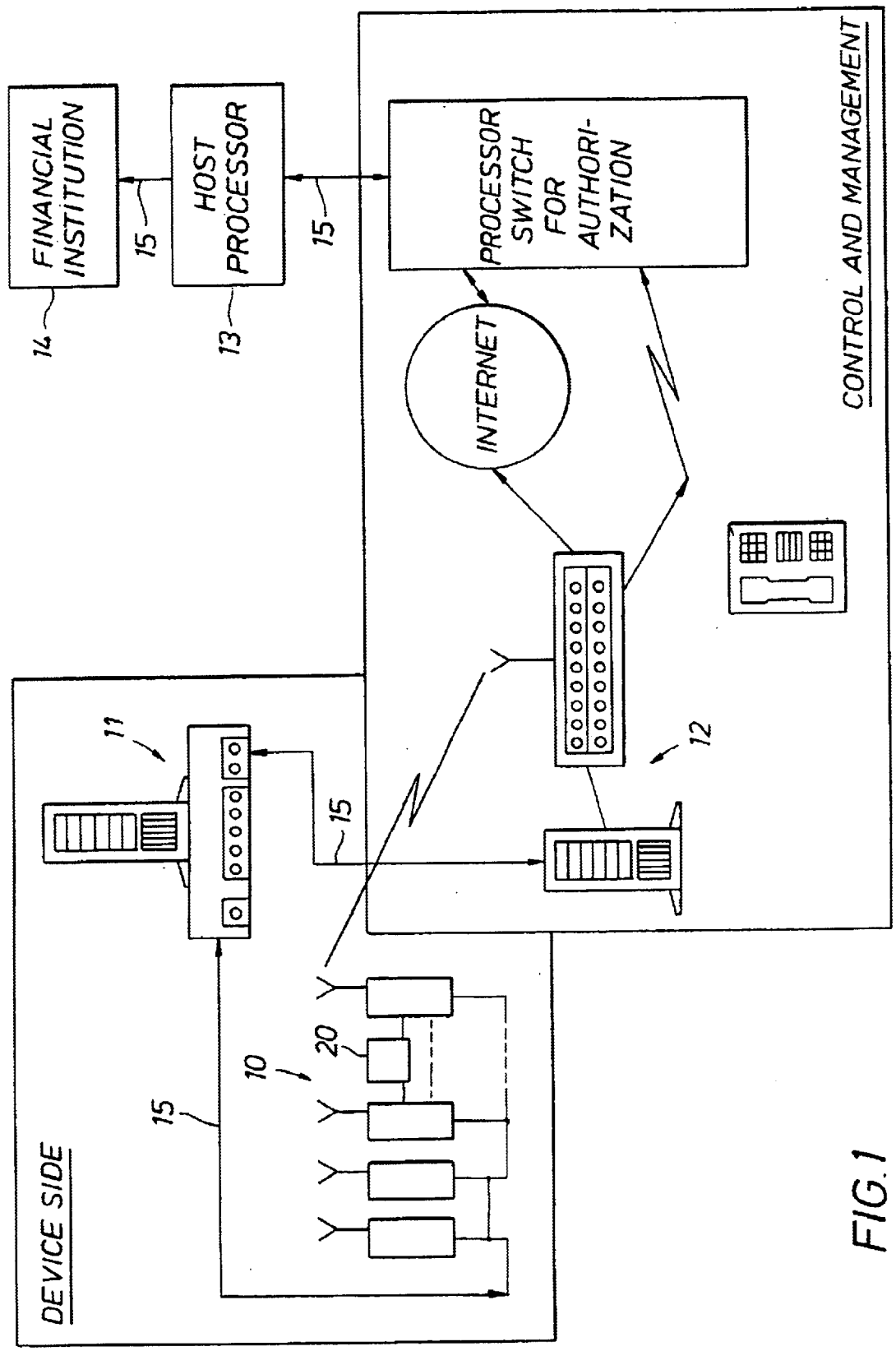
FIG. 1 is a schematic illustration of a system in accordance with the present invention.

As can be seen in FIG. 1, a system in accordance with the present invention preferably includes a plurality of entertainment machines 10 (illustrated for example purposes only, as slot machines) in communication with a slot accounting system 11. The system further includes an "active layer" computer and server 12 and an intermediate host server 13. The system is in communication with a financial institution 14.

The system is linked together via a communication conduit or channel 15. The communication channel may be wireless, telephonic, or another communication system. The communication channel may also be a combination of communication types.

A point of sale (POS) device 20 is preferably provided for each entertainment machine 10. Alternatively, there is at least one POS device located near each entertainment machine and in communication therewith. The point of sale device is coupled to active layer computer and server 12, which in turn is coupled to the host processor 13.

When a user at the entertainment machine needs more money, he enters his request, generally with, for example, a debit card including a magnetic strip or a smart card, and personal identification number (PSIN) into the POS device associated with the entertainment machine. This request is then transmitted to the active layer where a number of functions are performed prior to the submission of request for funds from the host processor system. The functions include, for example, history lookup, player tracking, responsible gaming exclusion, fraud screening, terminal management and relevant parameters.

If the active layer approves the request based upon the above-mentioned profiling, the request is forwarded to host processor 13. The host processor makes a preauthorization check at financial institution 14 in order to determine if the user has sufficient funds in his account at the financial institution and to ensure that the player has not exceeded the financial institution's daily limit for POS and/or ATM withdrawals.

If the financial institution authorizes the withdrawal, the host processor signals back to the active layer that the transaction has been approved. The active layer then sends two signals, one to the POS device associated with the entertainment machine indicating the approval to the user and the other to slot accounting system 11. The slot accounting system then signals the gaming machine to register the player's funds that have requested, i.e., credits the machine, for the user to use. Alternatively, the user may decide to cash them out of the machine.

In an alternative embodiment, the POS device signals the player to go to a cashier's cage to retrieve the requested funds. Additionally, the active layer may instruct a cashier to bring the funds to the player at the machine.

The host processor receives the funds from the bank via the network by requesting an electronic transfer of the funds from the bank to the host processor. The host processor intermittently, e.g. in the evening, settles with the casino by crediting an account of the casino with the accumulated funds processed by the host processor pursuant to players' requests approved since the host processor last settled with the casino.

Preferably, the active layer computer and server is located at the casino.

Thus, the POS device, the active layer, host system and the ATM-type network are intermediaries between the entertainment machine and the bank. The active layer prescreens the requests and decides if it should be further processed based on profiling. If the active layer clears the request, it is forwarded to the host system. Upon approval, the host system in effect becomes a creditor from the time use of the funds at the machine is authorized until the host processor actually collects the funds from the bank via the network.

As those skilled in art will understand, the active layer is generally a combination of hardware and software that provides the ability to identify/discovery POS or ATM-type devices at the entertainment machine(s) and connect them to the host processor. The examples of active layer components include: SUN servers, Oracle databases, TCP/IP com links and a web applications server. Generally, if wireless communications are provided between any of the various components, the radio frequency is preferably 2.4 Ghz.

While the present invention has been described with reference to gaming machines, those skilled in the art will understand that other types of entertainment machines may be used with the present invention. Additionally, those skilled in the art will understand that various components of the transactions may take place through wireless communication, over the internet, over ATM-type networks, and with standard modems and telephone lines.

Although the invention has been described with reference to specific exemplary embodiments, it will be appreciated that it is intended to cover all modifications and equivalents within the scope of the appended claims.

What is claimed is:

1. A method of providing money to a user at an entertainment machine in an institution, the method comprising:
   associating a point of sale device with the entertainment machine;
   placing the entertainment machine and the point of sale device in communication with an active layer;
   placing the active layer in communication with a host processor;
   placing the host processor in communication with a financial institution;
   requesting electronic funds via the point of sale device;
   forwarding the request to the active layer;
   profiling the request by the active layer and either approving or disapproving the request;
   forwarding the request to the host processor if the request is approved during profiling;
   requesting pre-authorization for the request from the financial institution; and
   providing electronic funds to the user within the institution if the request is preauthorized and profile approved.

2. A method in accordance with claim 1 wherein the request for electronic funds is not forwarded to the host processor if the request is not approved during profiling.

3. A method in accordance with claim 1 wherein the electronic funds are provided by a slot accounting system to the entertainment machine.

4. A method in accordance with claim 1 wherein the electronic funds are provided to a cashier's location in the institution.

5. A method in accordance with claim 4 wherein a representative of the institution provides funds by bringing money or gaming chips to the user.

6. A method in accordance with claim 4 wherein providing funds includes the user being instructed to go to the cashier's location to retrieve money or gaming chips.

7. A method in accordance with claim 1 wherein placing in communication includes using at least one of a wireless system, a telephone system and an internet system.

8. A system for providing money to a user at an entertainment machine through an ATM-type network, the system comprising:

a. a point of sale device associated with the entertainment machine;
   b. an active layer computer, distinct from the ATM-type network, in communication with the POS device;
   c. an intermediate host processor in communication with the active layer computer and a financial institution;
   wherein the active layer includes means for prescreening a request, the prescreening including transaction profiling.

9. The system of claim 8 wherein the transaction profiling includes history lookup.

10. The system of claim 8 wherein the transaction profiling includes player tracking.

11. The system of claim 8 wherein the transaction profiling includes responsible gaming exclusion.

12. The system of claim 8 wherein the transaction profiling includes fraud screening.

13. The system of claim 8 wherein "in communication with" includes by at least one of a wireless system, a telephone system and an internet system.

14. A system for providing money or playing credit to a user at an entertainment machine, comprising:
   a plurality of point of sale devices, each associated with an entertainment machine;
   an active layer in communication with the plurality of point of sale devices;
   a host processor in communication with the active layer and a financial institution;
   the active layer including
   means for receiving authorization for a request for money or credit associated with a point of sale device and means for instructing an entity associated with the point of sale device to provide money or credit relating to said authorization; and
   the host processor includes means for transmitting host funds, relating to an authorized request, to an account associated with the point of sale device.

15. The system of claim 14 wherein the host processor includes means for receiving funds from a financial institution relating to an authorized request.

16. The system of claim 14 wherein the entity includes the entertainment machine associated with the point of sale device.

17. The system of claim 14 wherein the entity includes an accounting system in communication with the entertainment machine associated with the point of sale device.

18. The system of claim 14 wherein the entity includes a cashier associated with the point of sale device.

19. The system of claim 14 wherein the entity includes personnel associated with the point of sale device.

20. The system of claim 14 wherein the host processor includes means for seeking pre-authorization of a request and means for receiving notice of authorization of the request.

21. The system of claim 14 wherein the active layer includes means for receiving said request from the point of sale device and means for transmitting said request to the host processor.

22. The system of claim 14 that includes an accounting system in communication with an entertainment machine and the active layer.

23. The system of claim 22 wherein active layer includes means for instructing the accounting system to instruct an entertainment machine to provide money or credit.

24. A method for providing money or credit to a user at an entertainment machine comprising:

requesting electronic transfer of funds via a point of sale device associated with an entertainment machine;

requesting pre-authorization for the funds from a financial institution by a host processor; and if the request is authorized:

delivering funds to a user at the entertainment machine; and transmitting host processor funds to an account associated with the entertainment machine.

25. The method of claim 24 including transmitting funds to a host processor account by the financial institution.

26. A method for providing money or credit to a user at an entertainment machine via an ATM-type network, comprising;

requesting electronic funds via a point of sale device associated with an entertainment machine;

prescreening a request by an active layer computer separate from the ATM-type network for approval;

requesting pre-authorization for the request from a financial institution by a host processor; and delivering funds to a user at the entertainment machine contingent upon approval and authorization.

27. The method of claim 24 wherein the prescreening includes transaction profiling based on history lookup.

28. The method of claim 24 wherein the prescreening includes transaction profiling based on player tracking.

29. The method of claim 24 wherein the prescreening includes transaction profiling based on responsible gaming exclusion.

30. The method of claim 24 wherein the prescreening includes transaction profiling based on fraud screening.

* * * * *